(12) United States Patent
Chung et al.

(10) Patent No.: US 8,200,819 B2
(45) Date of Patent: Jun. 12, 2012

(54) METHOD AND APPARATUSES FOR NETWORK SOCIETY ASSOCIATING

(75) Inventors: Shen-Ming Chung, Chiayi County (TW); Fang-Jung Hsu, Hsinchu (TW)

(73) Assignee: Industrial Technology Research Institute, Hsin-Chu (TW)

( * ) Notice: Subject to any disclaimer, the term of this patent is extended or adjusted under 35 U.S.C. 154(b) by 625 days.

(21) Appl. No.: 12/048,345

(22) Filed: Mar. 14, 2008

(65) Prior Publication Data

US 2009/0234910 A1  Sep. 17, 2009

(51) Int. Cl.
G06F 15/173 (2006.01)
G06F 7/04 (2006.01)
G06F 15/16 (2006.01)
G06F 17/30 (2006.01)
H04L 29/06 (2006.01)

(52) U.S. Cl. .............. 709/225; 709/204; 726/9

(58) Field of Classification Search .......... 709/204–206, 709/225; 726/9, 20
See application file for complete search history.

(56) References Cited

U.S. PATENT DOCUMENTS

| | | | | |
|---|---|---|---|---|
| 5,752,041 A * | 5/1998 | Fosdick | ................ | 717/178 |
| 7,284,127 B2 * | 10/2007 | Gehrmann | ................ | 713/169 |
| 7,343,008 B1 * | 3/2008 | Frankel | ................ | 379/202.01 |
| 7,464,267 B2 * | 12/2008 | Zhu et al. | ................ | 713/168 |
| 7,519,708 B2 * | 4/2009 | Malik | ................ | 709/225 |
| 7,587,197 B2 * | 9/2009 | Kimbrell | ................ | 455/410 |
| 7,752,253 B2 * | 7/2010 | Manion et al. | ................ | 709/200 |
| 2002/0186846 A1 * | 12/2002 | Nyberg et al. | ................ | 380/273 |
| 2003/0063735 A1 * | 4/2003 | Brockenbrough et al. | ... | 379/245 |
| 2003/0177184 A1 * | 9/2003 | Dickerman et al. | .......... | 709/204 |
| 2003/0217165 A1 * | 11/2003 | Buch et al. | ................ | 709/229 |
| 2004/0019701 A1 * | 1/2004 | McGee et al. | ................ | 709/250 |
| 2004/0103203 A1 * | 5/2004 | Nichols et al. | ................ | 709/229 |
| 2004/0243665 A1 * | 12/2004 | Markki et al. | ................ | 709/201 |
| 2004/0260701 A1 * | 12/2004 | Lehikoinen et al. | ........... | 707/10 |
| 2005/0250552 A1 * | 11/2005 | Eagle et al. | ................ | 455/567 |
| 2005/0254997 A1 | 11/2005 | Ocvirx et al. | | |
| 2006/0184997 A1 * | 8/2006 | La Rotonda et al. | ............. | 726/2 |
| 2008/0126113 A1 * | 5/2008 | Manning et al. | ................ | 705/1 |
| 2008/0219227 A1 * | 9/2008 | Michaelis | ................ | 370/338 |
| 2009/0150968 A1 * | 6/2009 | Ozzie et al. | ................ | 726/1 |
| 2010/0030695 A1 * | 2/2010 | Chen et al. | ................ | 705/67 |
| 2010/0257239 A1 * | 10/2010 | Roberts | ................ | 709/204 |

* cited by examiner

*Primary Examiner* — Joseph Avellino
*Assistant Examiner* — James Baron
(74) *Attorney, Agent, or Firm* — WPAT., P.C.; Justin King

(57) ABSTRACT

The method of the invention applies employing token, public key, private key and ad hoc technology to associate members who are interested to join a specific society, with which the member's privacy can be protected and the trust between members can be build. The apparatus is directed to a social network which is responsible for communications and association of a specific society.

22 Claims, 14 Drawing Sheets

| Acknowledge Index | In Use | Inviter NID | Inviter Token | Invitee IP Address | Invitee Public Key | Society ID |
|---|---|---|---|---|---|---|
| 0 | NO | X | X | X | X | X |
| 1 | NO | X | X | X | X | X |
| 53025 | YES | 2 | Joseph | 140.96.194.35 | Key$_C$ | 786 |
| 53026 | YES | 1202 | Ken | 140.93.35.73 | Key$_D$ | 786 |

FIG. 8

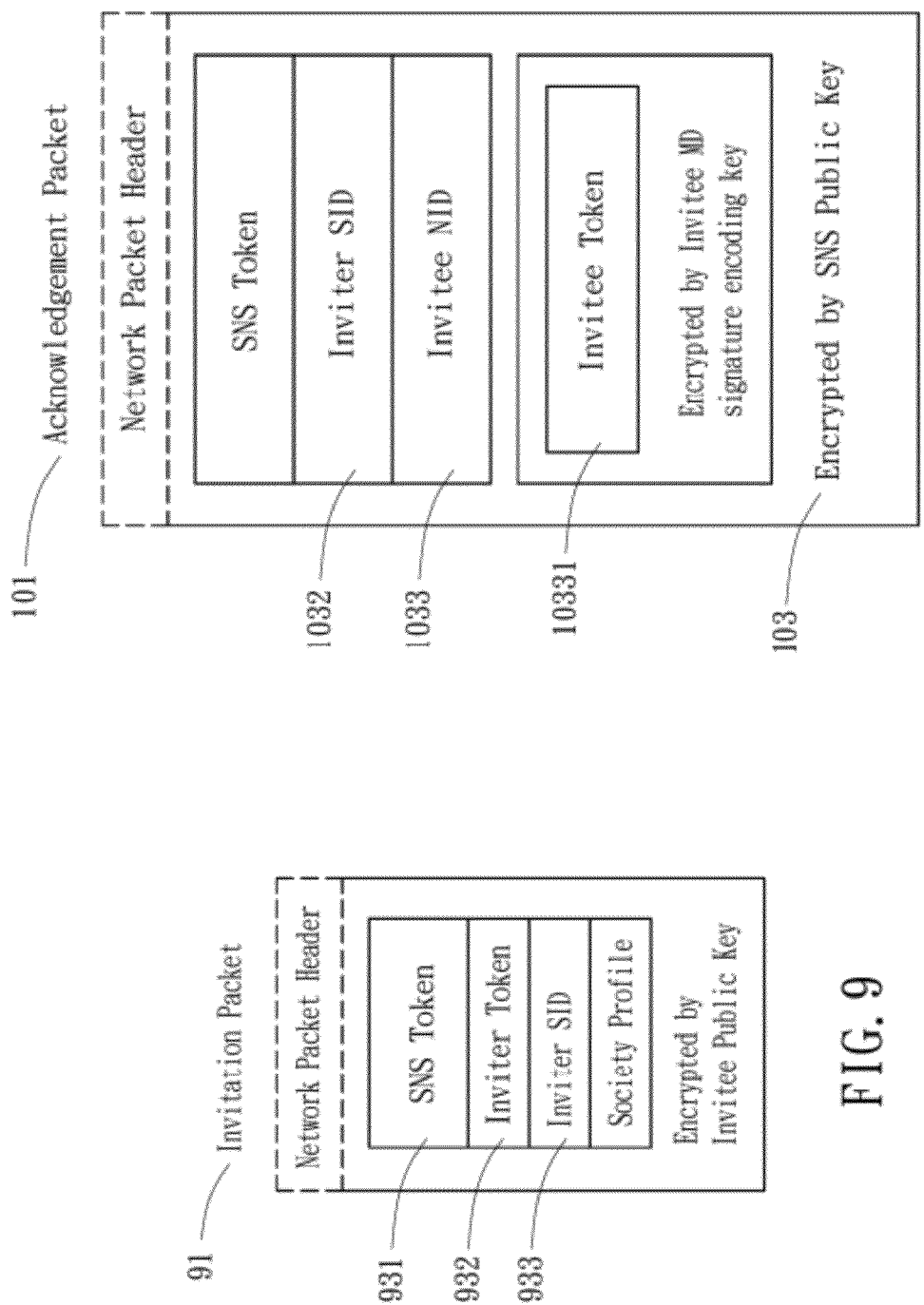

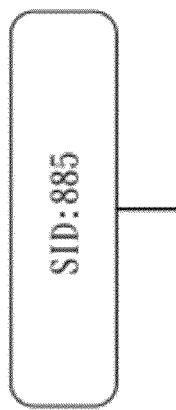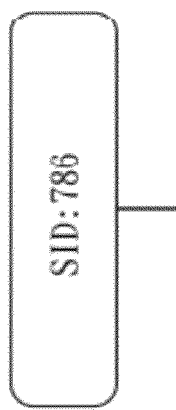
FIG. 12

METHOD AND APPARATUSES FOR NETWORK SOCIETY ASSOCIATING

FIELD OF THE INVENTION

The present invention relates to a method for network society associating and the apparatuses thereof.

BACKGROUND OF THE INVENTION

Network societies emerged quickly after the Internet technology became popular. These network societies are usually constructed via at least one network server which manages the relations of society members for each society. In recent years, such a network server is usually called Social Network Server (SNS) and the combination of members and their relations is called social network.

Social network usually considers each person as a node. A node may have associations with other node(s) in the social network. Association is typically represented by a line linking two nodes. Several metrics can be derived from a social network having multiple nodes and lines. Relation Degree is the simplest metric for determining how close two nodes are. Two nodes are defined to have first-degree relation if there is a line linking the two nodes. In existing applications, two nodes having first-degree relation may indicate that they can contact with each other by certain communication method, such as telephone, e-mail, instant message, peer-to-peer streaming and the like. Two nodes having second-degree relation if from one node there can be found a path passing only two lines to the other node. Two nodes having degree order larger then first-degree may suggest that the corresponding two persons did not know each other but they did have certain relationship between them.

Before providing various applications based on the social network, certain platforms should be setup to gather users and make associations among them. Recent years, websites are a kind of popular platform to make up social networks. Users use their web browser to visit websites and join them as member. During the web activities, such as making and storing friend contact list in the websites, node associations can be made up and the social network of the websites can be constructed.

To provide specific topics, such as dating and chatting, the online social network services enable users having degree order larger than first-degree to connect with each other. In order to avoid offending user privacy, there are rules of selecting to whom one can connect based on certain metric(s) such as the Relation Degree mentioned above. Though such a selection may facilitate the social network management and lower the risk of exposing user privacy in certain level, problem is still not solved. That is, however the rules are defined, looser rules may still have risk of exposing user privacy while stricter rules still limit the interaction of its social network.

Besides the problem mentioned above, the establishment of current social network has other problems. For example, users usually need to react with the network societies via a computer or a compatible device and the candidates of the network society member are usually computer men. These all limit the growth of the social network.

Compared with the virtually existed network society, societies in real world have more trust between their members since members may already be familiar and contact with each other. Besides, the population of real world societies is far bigger then the candidates of network society members. Hence, if Internet and Communication Technology (ICT) can be used to organize societies in real world and provide useful services, large business may be derived.

Therefore, this invention provides a complimentary society association scenario and method to assist the growth of social network while providing satisfied user privacy. The preferable embodiment shows that the invention enables the society association to take place in everywhere and in everyday life. Based on the invention, various innovative online social services can be derived since network societies can be expended to every person equipped with mobile device.

As mentioned previously, to provide specific topics, such as dating and chatting, the online social network services may enable users to connect with whom they never know before. There are rules of selecting with whom one can contact and the rules are predefined by the online social network services. However the rules are defined, looser rules may still have risk of exposing user privacy while stricter rules still limit the interaction of its social network.

In order to solve such problems, Yahoo Incorporation issued a patent application with Publication Number 2006/0184997. The application mentions that:

"However, potential new users may be reluctant to join an online service and/or to respond to a request to participate with another member of the online service not known to the user. An invitation from a known contact may help an invitee feel more comfortable about joining the service. However, even an invitee may be reluctant to join before seeing a sample of the service."

"To build trust quickly, information about an inviter can be provided to the invitee. For example, the invitee may be allowed to temporarily access content from the inviter's personal web page. The content may include the inviter's web log, a collection of photos, a list of recommended restaurants, and/or other content relevant to the inviter."

That is, Yahoo incorporation proposed that, in order to gain the invitee's trust, inviter can first invite the invitee to visit his personal information.

Yahoo's patent application hopes that they can, based on looser rules, combine an invitation method with inviter's personal information to gain trust during society association. Such a method solves the problems in certain level; however, the commonly existing "trust" problem among the online social service is further emphasized by this patent application.

There is another US patent with Publication No. 2005/0250552 disclosed by Massachusetts Institute Technology (MIT), in which portable communication devices have been introduced, such as Bluetooth enabled cellular phones, to communicate with and identify like devices that are nearby, and send notification messages to a remote server. When a notification message is received at the server identifying two devices that have come within range of one another, the server compares the profile data associated with each of the two identified devices and facilitates communications between the devices when appropriate.

Looking into more details about MIT's application, it basically solves the problem of mobility and enables the social network associations to be expended to every person equipped with mobile device. However, it does not provide too much solution in security problem since it uses the user's account information as the token to exchange user's information. As stated in MIT's application, when a mobile devices sending its notification message to invite another mobile device to join a specific topic, the notification message sent from the device to the server includes not only its own ID value (the Requester ID) but also the ID value of the mobile device being invited (the Identified ID). Since a mobile device in MIT's application can easily get other mobile device's ID value, it may hack the system in several ways, such as pretending to be other mobile device by responding other mobile device's ID value to the server instead of its own ID value.

SUMMARY OF THE INVENTION

The method of the present invention is provided for network society associating, with which the privacy of the network user who is interested to join a specific society can be protected and the trust between inviter and invitee can be built. The apparatus for network society associating, which employs token, public key and private key and ad hoc connection establish relationship between network users, and with which the privacy of the network user who is interested to join a specific society can be protected and the trust between inviter and invitee can be built.

Furthermore, the method is applied to a server identification network for two mobile devices exchange their network address and token with each other by ad hoc connection; wherein the server verifies the invitation request message by checking the consistency between the inviter node identification and inviter specified society and the data stored in the society network database. If consistent, the server sends an invitation request message to the other mobile device acting as an invitee at the network address via the network, wherein the invitation request message comprising a server token which is generated by the server, the inviter's token and a profile of the society specified by said inviter specified society. By checking the consistency between the inviter's token in the invitation request message and the token being exchanged during the ad hoc connection, the profile of the society is displayed on the invitee's screen and waiting for a invitee's user whether to accept the invitation request message. If the user accepts the invitation request message, the invitee sends an acknowledgement message to the server, wherein the acknowledgement message comprising the server token and a invitee's node identification. Once the server checks the server token in the acknowledgement message is valid, the server associates the invitee's node with the inviter's node in the society specified by the inviter specified society. According to the apparatus for conducting this network of society association, comprising a communication interface with a server managing social network database is assigned with a network address; a data exchanging interface for exchanging data with other mobile device in surrounding; a memory for storing a plurality of instructions and a local token; a processor performs actions based at least partially on the plurality of instructions, comprising to communicate the messages with the communication interface, the data exchanging interface and the memory. Moreover, the communication enabling the data exchanging interface to exchange the local token and the network address with a mobile device in surrounding, storing the exchanged token as a remote token in the memory, sending a first message to the server to start a society association process, receiving a second message comprising an inviter's local token and a server token from the server, checking whether the second message is valid by comparing the inviter's local token with the remote token, and sending a third message including the server token to the server to complete a society association process. The first message comprises a mobile device's node identification as the inviter node identification, the local token and a remote network address.

BRIEF DESCRIPTION OF THE DRAWINGS

FIG. 8 is a schematic view showing an Acknowledgement Lookup Table according to the present invention.

FIG. 9 is a schematic view showing an Invitation Packet according to the present invention.

FIG. 10 is a schematic view showing an Acknowledgement Packet according to the present invention.

FIG. 12 is a schematic view showing two societies recorded in the social network database according to the present invention.

DESCRIPTION OF THE PREFERRED EMBODIMENT

The present invention is abstracted below. First, each mobile device practicing in this invention is assigned a unique identification code as its Node Identification (NID) in the social network. Then, as an inviter mobile device exchanged certain information including a token with an invitee mobile device by using ad hoc technology, a society association process can be initiated by the inviter mobile device by noticing the SNS with information including the token. SNS will generate another token for this society association process. By using these two tokens, authentications between the mobile devices and SNS can be accomplished. Note that, since the NID is so confidential, during the whole society association process, the two mobile devices do not get each other's NID. Besides, for security consideration, the preferable embodiment applies the Public Key System (PKS) to establish secured communication channels. Due to the good properties of this invention, only the communication channel between mobile devices and SNS should be ensured secured by PKS, leaving the ad hoc connection (i.e. the communication channel between mobile devices) as simple as possible.

For your esteemed members of reviewing committee to further understand and recognize the fulfilled functions and structural characteristics of the invention, several preferable embodiments cooperating with detailed description are presented as the follows.

Figure 1:
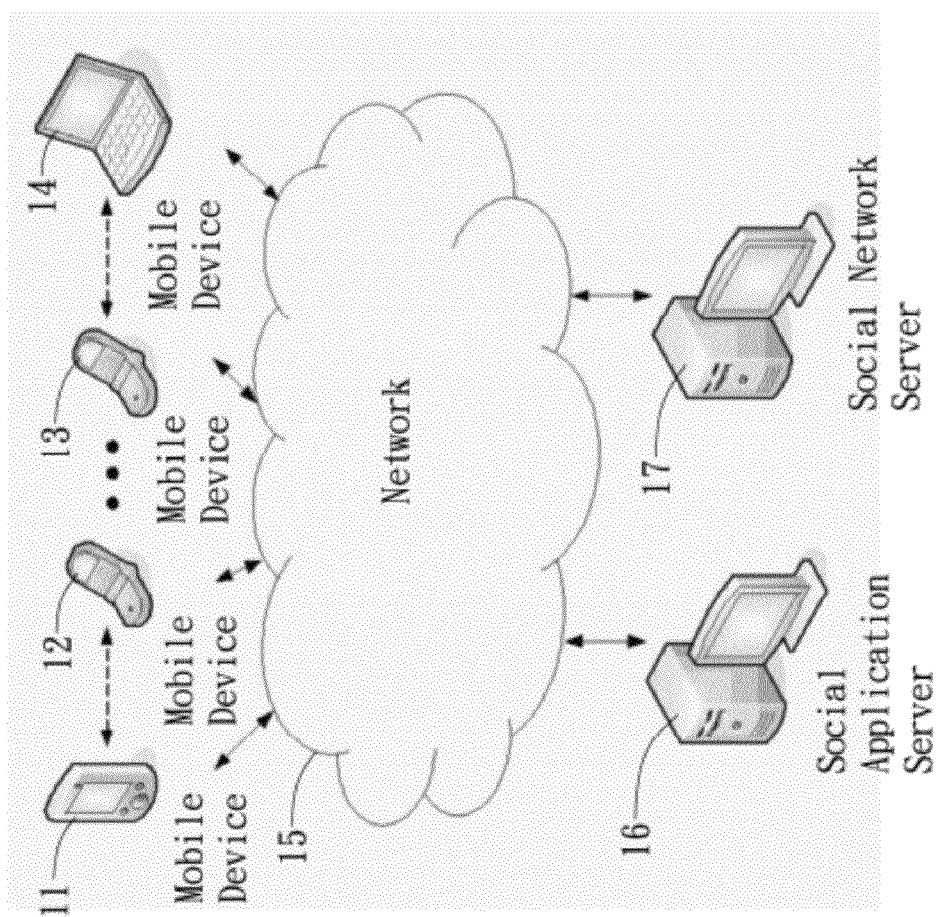
FIG. 1 is a schematic view of a network system according to the present invention.

Please refer to FIG. 1, which is a schematic view of a network system according to the present invention. As shown in FIG. 1, the network system includes mobile devices 11, 12, 13 and 14, a network 15, an optional social application server 16 and a social network server (SNS) 17. Mobile devices 11, 12, 13 and 14 may include virtually any computing device capable of receiving/sending messages over the network from/to the SNS 17 and capable of contact to each other via ad hoc connection. The set of such mobile devices may include devices that typically connect using a wireless communications medium such as cell phones, smart phones, notebook, walkie-talkies, or virtually any mobile communication device, and the like. The optional social application server 16 provides social application based on the social network database managed by the SNS 17.

As shown in FIG. 1, one computing device is connected to another via the network 15 whereby the two computing devices may communicate with each other. The network can be in any form of computer readable media for communicating information among electronic devices. Also, the network 15 may include wireless and wired interfaces, including local area network (LAN) and wide area network (WAN), for communication for devices. The local area networks may be constructed by hubs and/or switches, and a router may be used to couple said LAN and said WAN hence enlarging the communication region.

Figure 2:
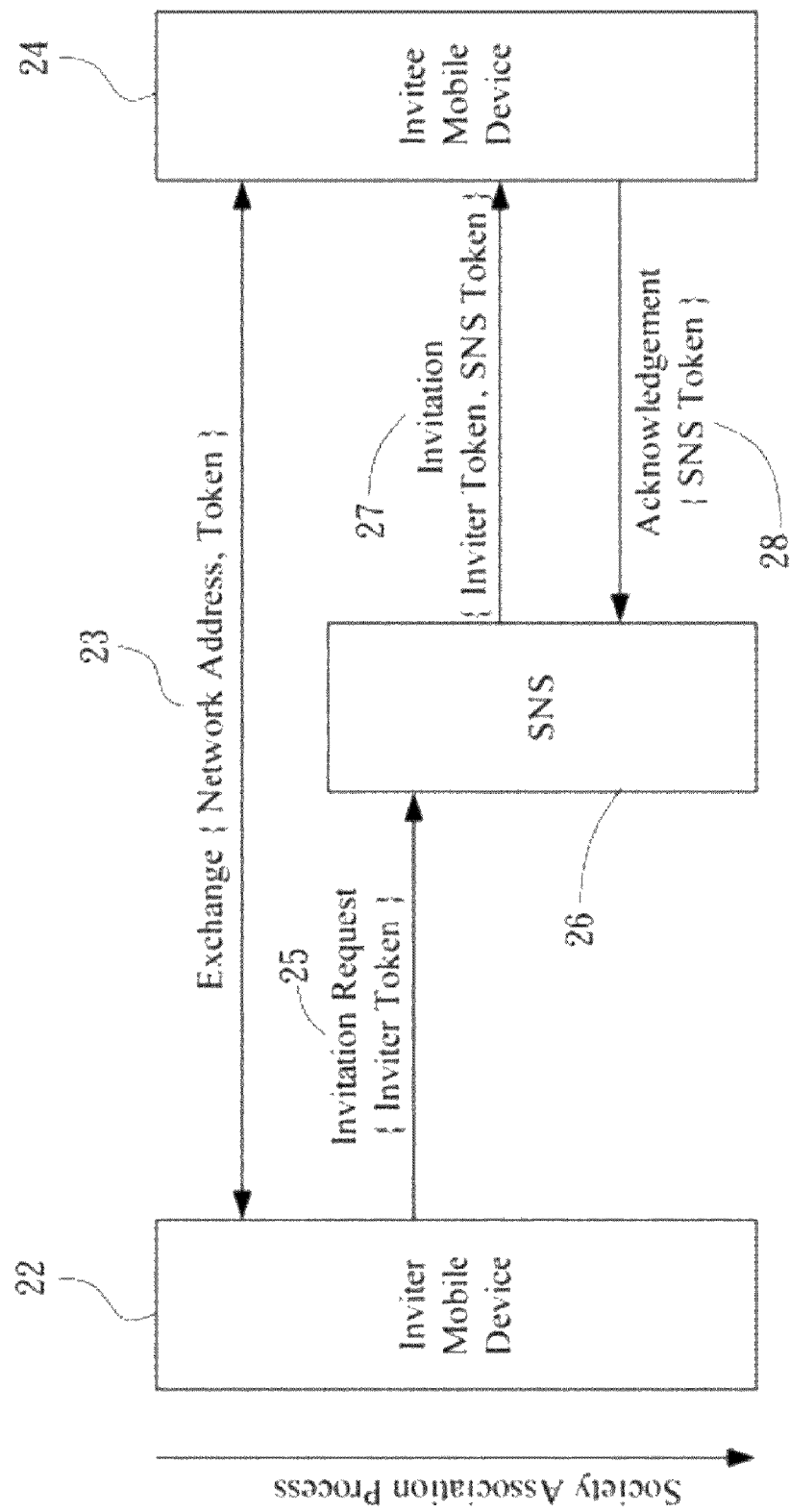
FIG. 2 is a schematic view of process of the network society associating method according to the present invention.

Please refer to FIG. 2, which is a schematic view of process of the network society associating method according to the present invention. As shown in FIG. 2, the method of the invention comprises at least four steps to accomplish a society association process between two mobile devices.

Step 23: the two mobile devices 22 and 24 exchange each other's network address and token via ad hoc connection;

Step 25: one of the two mobile devices acts as an inviter mobile device 22 and sends a message which includes the inviter's token (or simply called inviter token) and invitee's network address (or simply called invitee network address) to the SNS 26, wherein the message is called the Invitation Request;

Step 27: the SNS 26 sends a message to the other mobile according to the invitee network address and treat it as the invitee mobile device 24, wherein the message is called the Invitation which includes the inviter token and an SNS-generated token;

Step 28: the invitee mobile device 24 receives the message from the SNS 26 and checks whether the message is valid by comparing the inviter token and the previously exchanged token in Step 23, and if valid, sends a message including the SNS-generated token to the server to grant the invitation, wherein the message is called the Acknowledgement.

In Step 23, two mobile devices exchange data based on ad hoc technology. The said data includes the each other's currently assigned network address and a token. The said token is preferably a text-based token such as currently user-named device identification, since text-based tokens can be used for users of mobile device to intuitively authenticate each other. The token will also be a key to determine whether the society association is valid in the step 28.

In Step 25, one of the two mobile devices acts as an inviter and sends a message called Invitation Request to request the SNS that the inviter wants to invite a mobile device at specified network address to join the inviter specified society. In this step, at least the invitee mobile device's currently assigned network address and the inviter mobile device's token are provided by the inviter. With the invitee network address, the SNS is aware of where the invitee mobile device is.

In Step 27, the server sends a message called Invitation to the invitee mobile device 24 in the provided network address to notice that the inviter specified society wants to invite the invitee mobile device 24. In this step, two tokens are sent to the invitee mobile device 24, wherein one of the tokens is provided by the inviter mobile device 22 and the other is generated by the SNS 26.

In Step 28, the invitee mobile device 24 compares the inviter token in the Invitation with the previous exchanged token to determine whether the Invitation from the SNS 26 is consistent with the currently ad hoc connected nearby mobile device. If the tokens are consistent and the user of the invitee mobile device wants to accept the invitation, the invitee mobile device sends a message called Acknowledgement which includes the SNS-generated token to the SNS to grant the invitation. After receiving the Acknowledgement, the SNS checks whether the SNS-generated token is valid to authenticate the Acknowledgement. If the received token is valid, the SNS associates the invitee's node with the inviter's society in the social network database to finish the society association process.

Before practicing the invention, each mobile device must be assigned a unique identification code for being associated with a node in the social network database. The identification code is called Node Identification (NID) in this invention. The NID can be coded in any kinds of form as long as it can assure the uniqueness property. For example, the WLAN MAC address may assure the uniqueness in a wireless Local Area Network and the coding inside the Subscribe Identification Module (SIM) also has the uniqueness property in the cell phone system. Besides, combining existed coding forms with certain extension code can also extend the uniqueness property to further wider network range.

Figure 3:
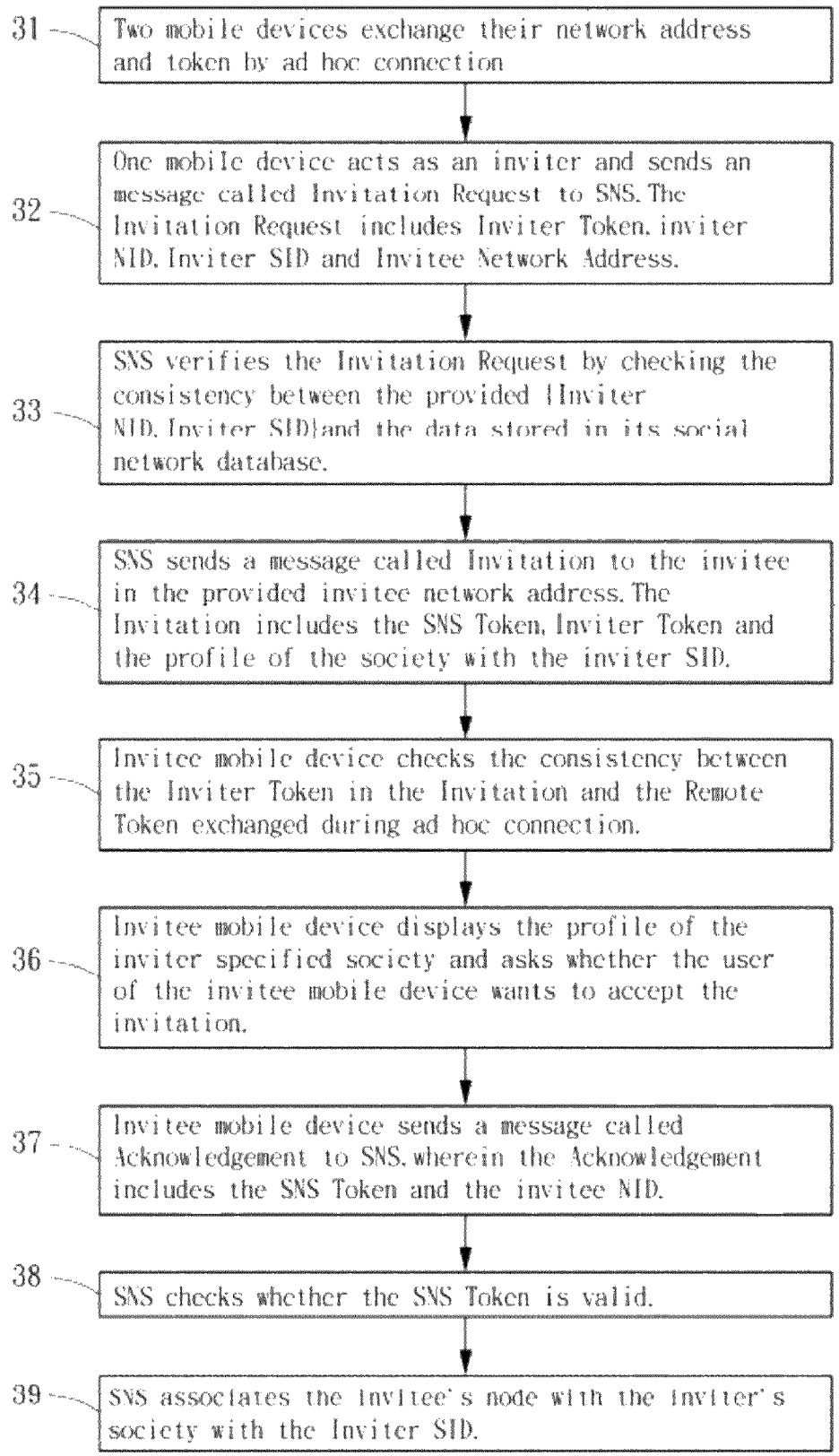
FIG. 3 is another schematic view in more details of process of the network society associating method according to the present invention.

Please refer to FIG. 3, which is another schematic view in more details of process of the network society associating method according to the present invention. FIG. 3 shows the flow diagram illustrative exemplary logic of an exemplary overall process of actions by the inviter mobile device, the invitee mobile device and the SNS that associates nodes in a social network As shown in FIG. 2 and FIG. 3, the method of the invention comprises that two mobile devices conduct an association process to associate their corresponding nodes in the social network managed by the SNS. During the association process, the mobile device initiating the process is called the inviter mobile device while the other is called the invitee mobile device. In Step 31, said two mobile devices contact with each other by certain ad hoc connection to exchange data including their assigned network addresses (by, for example, DHCP server) and their token. For each mobile device, its own token is called Local Token and the exchanged token is called Remote Token. As mentioned, each said token is preferably a text-based token such as currently user-named device identification. More specifically, the text-based token could be a user-named device identification appended with a timestamp for higher confidentiality purpose. (The feature to allow user to name his mobile device is commonly seen in many cell phone. For example, a cell phone with Bluetooth function may allow user to name the cell phone in text so that other Bluetooth user may discover the cell phone with the name.) With the text-based tokens exchanged and shown on the display of mobile devices, the users of mobile devices can intuitively authenticate each other. Since in real world society, people usually see and talk with each other before an invitation takes place, a text-based token is sufficient to authenticate each other.

Note that, though the exchanged data are essential in the invented society association method, it is not confidential to the users of each mobile device. That is exposing the token and/or the currently assigned network address causes little or negligible harm to the users of the mobile device.

After exchanging each other's network address and token, in Step 32, a mobile device acts as an inviter and constructs a message called Invitation Request based on the exchanged data and some information managed inside the inviter mobile device, wherein the Invitation Request at least includes the Inviter Token, Inviter NID, an ID of the inviter specified society (called the inviter Society ID; inviter SID) and the Invitee Network Address. After the constructing, the constructed Invitation Request is sent to the SNS.

In response of receiving the Invitation Request, in Steps 33 and 34, the SNS checks the validity of the message by comparing the pair of inviter NID and inviter SID with the data stored in its social network database. If in its social network database there is no pair of inviter NID and inviter SID consistent with the received pair, the inviter has no authority to initiate an invitation and the invitation is failed. Otherwise, a token called SNS Token is generated by the SNS for the invitation and a message called Invitation is sent to the invitee mobile device in the provided Invitee Network Address. The Invitation includes at least the generated SNS Token, Inviter Token and the profile of the society with the Inviter SID. The SNS Token is associated with a table entry for storing the content of the Invitation Request, wherein the associated table is called Acknowledgement Lookup Table. With this association, the content can be quickly referred by the SNS Token.

In Steps 35, 36 and 37, in response of receiving the Invitation, the invitee checks whether the Inviter Token in the Invitation is consistent with the Remote Token exchanged during the ad hoc connection. If not consistent, the Invitation is not valid and the invitation is failed. If consistent, the invitee mobile device displays the profile of the society provided in the Invitation and asks whether the user of the invitee mobile device accept the invitation. If the user of the invitee mobile device rejects the invitation, the invitation is failed. If the user accepts the invitation, the invitee mobile device constructs and sends a message called Acknowledgement to the SNS, wherein the Acknowledgement at least includes provided SNS Token and Invitee NID.

In Steps 38 and 39, in response of receiving the Acknowledgement, the SNS checks the validity of the Acknowledgement by checking the validity of the received SNS Token. Since each SNS Token is associated with an entry of the Acknowledgement Lookup Tables which storing the content of Invitation Request, if the received SNS Token is valid, the SNS associates the invitee's node with the society identified by the Inviter SID and the society association process is accomplished.

Figure 4:
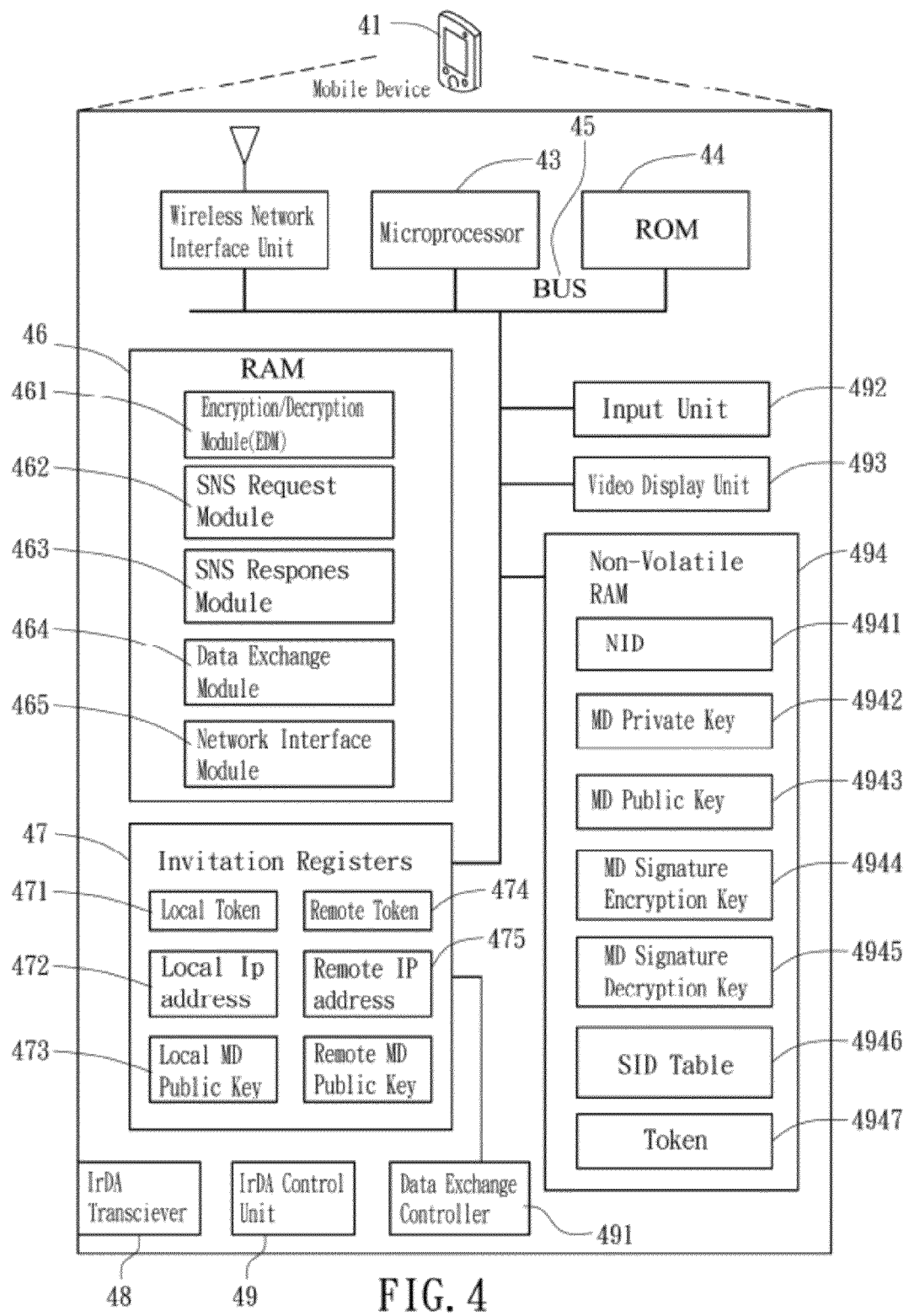
FIG. 4 is a schematic view showing the structure of a mobile device according to the present invention.

Please refer to FIG. 4, which is a schematic view showing the structure of a mobile device according to the present invention. As shown in FIG. 4, the mobile device 41 may include many more components than those shown. The components shown, however, are sufficient to disclose an illustrative embodiment for practicing the invention.

The mobile device (or called MD in brief) 41 shown in FIG. 4 includes a microprocessor 43, a video display unit 493, an input unit 492, a ROM 44, a RAM 46 and a Non-Volatile RAM (NVRAM) 494, all in communication with each other via the bus 45. The NVRAM 494 contains an NID 4941 which identifies the mobile device 41 as a unique node in the social network database managed by the SNS. The NVRAM 494 further includes two key pairs according to the Public Key System (PKS). The first key pair contains an MD Private Key 4942 and an MD Public key 4943, and the other contains an MD signature encryption key 4944 and an MD signature decryption key 4945. The NVRAM 494 further includes a Society ID Table 4946 recording the SID of each society which the mobile device currently joined.

The MD Public Key is advertised to all computing components which are intent to communicate with the mobile device. Computing components which want to send confidential messages to the said mobile device should first encrypted the messages by the mobile device's MD Public Key 4943 and then send the encrypted message to the mobile device. The Encryption/Decryption Module (EDM) 461 of the mobile device uses its MD Private Key 4942 to do decryption and then read the content of the messages. According to the PKS, since the message encrypted by an encryption key of the key pair can be only decrypted by the decrypted key of the key pair, the computing components sending the confidential message can assure that the content of the message can only be read by the said mobile device. Hence the key pair of the MD Public Key 4943 and the MD Private Key 4942 is utilized by the embodiment for confidentiality.

The MD Signature Decryption Key 4944 is advertised to the SNS before the invented society associating procedure. The EDM 461 of the mobile device uses the MD Signature Encryption Key 4944 to encrypt the mobile device's signature. In the embodiment, the mobile device uses its token 4947, e.g. a text-based token, as its signature. The said token is encrypted by the EDM 461 based on the MD Signature Encryption Key 4944 and the encrypted token will be sent to the SNS while the mobile device is going to initiate an invitation. In the invented society association process, the inviter mobile device puts the encrypted token into the Invitation Request and sends it to the SNS. According to the PKS, since data encrypted only by the MD signature encryption key can be correctly decrypted by the previously advertised MD signature decryption key 4945, the SNS is convinced that the packet with encrypted token is from the inviter mobile device as long as the encrypted token can be correctly decrypted. Note that, since the token is generated by the mobile device and the SNS does not previously know it, the definition of "correctly decrypted" is that a text-based result is got after decrypting the encrypted token. Text-based result can identified easily in computer system, e.g. by checking whether the range of ASCII Code of each decrypted character of the encrypted token is within the range of ASCII Code of text characters.

The mobile device further includes a Data Exchange Controller 491 which controls IrDA Control Unit 49 to make ad hoc connection with a remote mobile device. IrDA Transceiver 48 transfers Infrared radiation signals to electrical signals and transfers electrical signals from IrDA Controller Unit 49 to Infrared radiation signals. Via IrDA Control Unit 49 and IrDA Transceiver 48, Data Exchange Controller 491 exchanges data with a remote mobile device. The exchanged data include both mobile device's token, network address (IP Address assigned by DHCP server in this embodiment) and MD Public Key. The exchanged data are stored in the Invitation Registers 47 as shown in FIG. 4.

The Data Exchange Module 464 in the RAM 46 is executed by the microprocessor 43 to initialize the Invitation Registers 47 and enable the Data Exchange Controller 491 to start exchanging data with a remote mobile device. To initialize the Invitation Registers 47, the Data Exchange Module 464 copies the token 4947 in NVRAM 494, the assigned IP address given by the Network Interface Module 465 and the MD Public Key 4943 in NVRAM 494 to the Local Token 471, Local IP Address 472, and Local MD Public Key 473 in Invitation Registers 47 respectively. After the initialization, Data Exchange Module 464 enables the Data Exchange Controller 491 to start exchanging data with the remote mobile device.

The mobile device further includes an SNS Request Module 462 which constructs the embodiment of the message Invitation Request, i.e. the Invitation Request Packet, based on the data in the Invitation Registers 47 and data in the NVRAM 494. As shown in FIG. 8, the Invitation Request Packet contains Inviter Token, Inviter NID, Inviter SID, Invitee IP address and Invitee Public Key, wherein the Inviter Token and invitee IP address are copied from the Local Token 471 and the Remote IP address 475 in the Invitation Registers 47 while the Inviter NID and Inviter SID are copied from the NID 4941 and SID 4946 in the NVRAM 494. Note that, the Inviter SID is selected from the Society ID Table 4946 in the NVRAM 494 by the user. Since the SNS owns a copy of the SID Table 4946 for each mobile device (or called node,) the mobile device can only pick one SID from its Society ID Table 4946 as a valid Inviter SID. Invitation Request Packet containing wrong Inviter SID will be dropped by the SNS and several security mechanisms can be conducted by the SNS to take care of such circumstance, such as recording the event and/or sending warnings to the mobile device with the NID. Above all, after the Invitation Request Packet is constructed, the SNS Request Module 462 sends it to the SNS via the Network Interface Module.

For security considerations, the SNS Request Module 462 may ask the EDM 461 to encrypt the payload of the Invitation Request Packet according to the SNS Public Key, and before the encryption, the Inviter Token in the payload is replaced by an encrypted one as mentioned (by the MD signature encryption key.)

The mobile device further includes an SNS Response Module 463 to interact with the messages from SNS. As the SNS receives an Invitation Request Packet which records the invitee network address, the SNS may send, if the Invitation Request Packet is valid, an embodiment of the Invitation called Invitation Packet to the mobile device in the invitee network address, wherein the Invitation Packet comprises an SNS Token, the Inviter Token, the profile of the inviter specified society. After the mobile device received the Invitation Packet from the SNS, the SNS Response Module 463 compares the Inviter Token with the previously exchanged Remote Token in the Invitation Registers 47 for authenticating the received Invitation Packet. If the Inviter Token is consistent with the Remote Token 474, the received Invitation Packet is valid and the profile of the inviter specified society is displayed in the Video Display Unit 493 for the user's reference. SNS Response Module 463 also asks the user of the mobile device for whether to accept the invitation. If the user accepts the invitation, an embodiment of the Acknowledgement called Acknowledgement Packet is constructed by the SNS Response Module 463 and sent to the SNS via the Network Interface Module. The Acknowledgement Packet comprises the SNS Token, the Invitee NID and the Invitee Token.

For security considerations, the SNS Response Module 463 may ask the EDM 461 to encrypt the payload of the Acknowledgement Packet according to the SNS Public Key, and before the encryption, the Invitee Token in the payload is replaced by the encrypted one (by the MD signature encryption key.)

Figure 5:
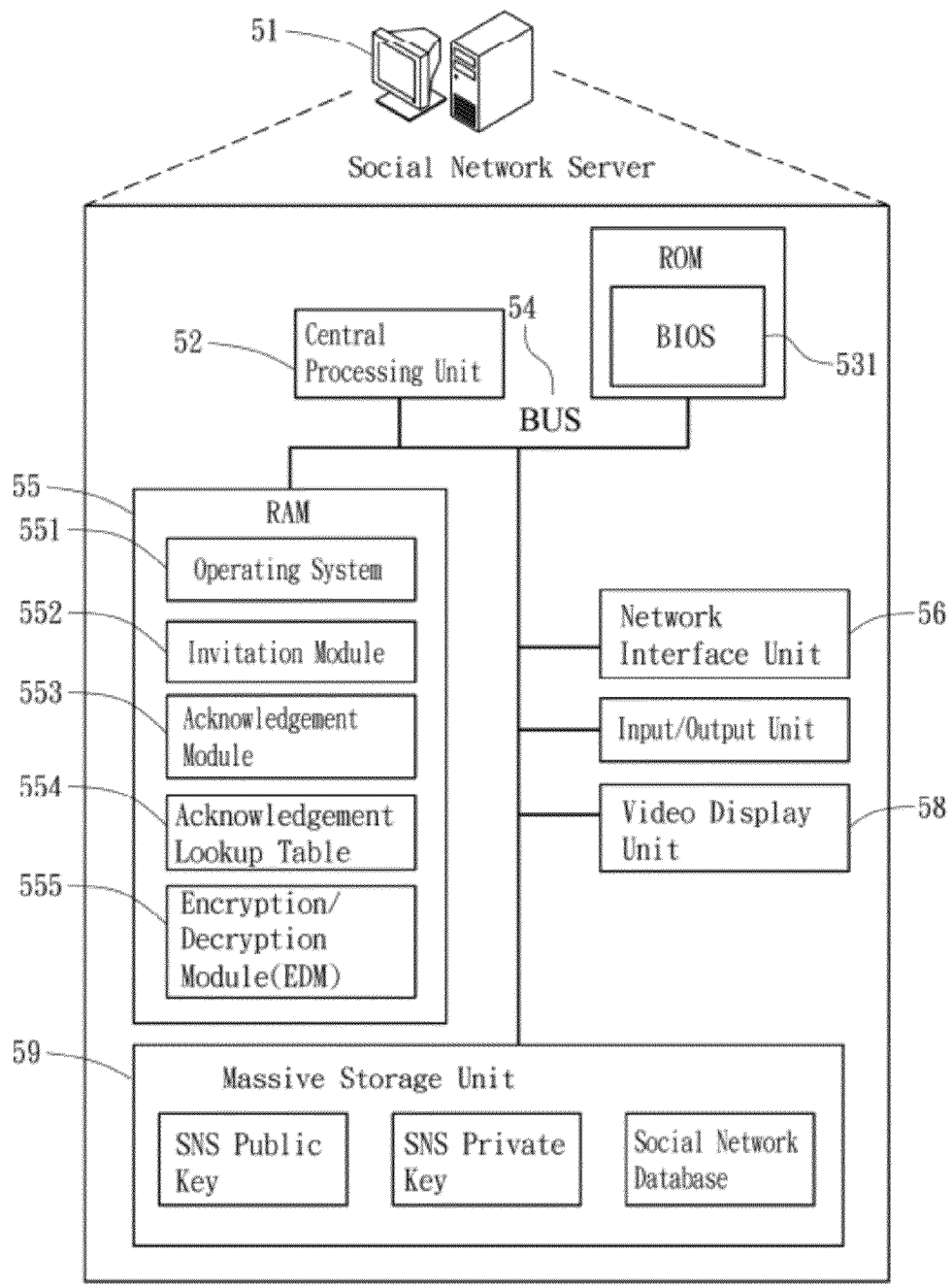
FIG. 5 is the schematic view of the SNS according to the present invention.

FIG. 5 shows the schematic view of the SNS according to the present invention. SNS may include many more components than those shown. The components shown, however, are sufficient to disclose an illustrative embodiment for practicing the invention.

As shown in FIG. 5, the SNS 51 includes a central processing unit 52, a video display unit 58, and a massive storage unit 59, all in communication with each other via the bus 54. The massive storage unit 59 may be the combinations of non-volatile memory, hard disk, CD-ROM, DVD-ROM or any kind of media which can permanently store data. The SNS 51 also includes a network interface unit 56 constructed for use with various communication protocols including but not limited to the TCP, UDP and IP protocols to communicate with other computing device. Basic input/output system (BIOS) 531 is provided for controlling the low-level operation of SNS 51. Any general-purpose operating system 551 may be employed to run modules stored in the RAM 55 and to provide needed communication protocols as mentioned.

Besides the operating system 551, the RAM 55 may further include modules for conducting society association process, such as the Invitation Module 552 and the Acknowledgement Module 553 shown in FIG. 5. The Invitation Module 552 is responsible of 1) Authenticating received Invitation Request Packet, 2) constructing Invitation Packet, 3) sending constructed Invitation Packet to an invitee mobile device in specified IP address and 4) associating the invitee mobile device with the inviter specified society. The Acknowledgement Module 553 is responsible of 1) generating the SNS Token, 2) managing the Acknowledgement Lookup Table 554 and 3) authenticating incoming Acknowledgement Packet. The RAM 55 may further include Encryption/Decryption Module (EDM) 555 to do encryption/decryption on the necessary outgoing/incoming packet respectively. The interaction relationship is shown in the FIG. 6.

Figure 6:
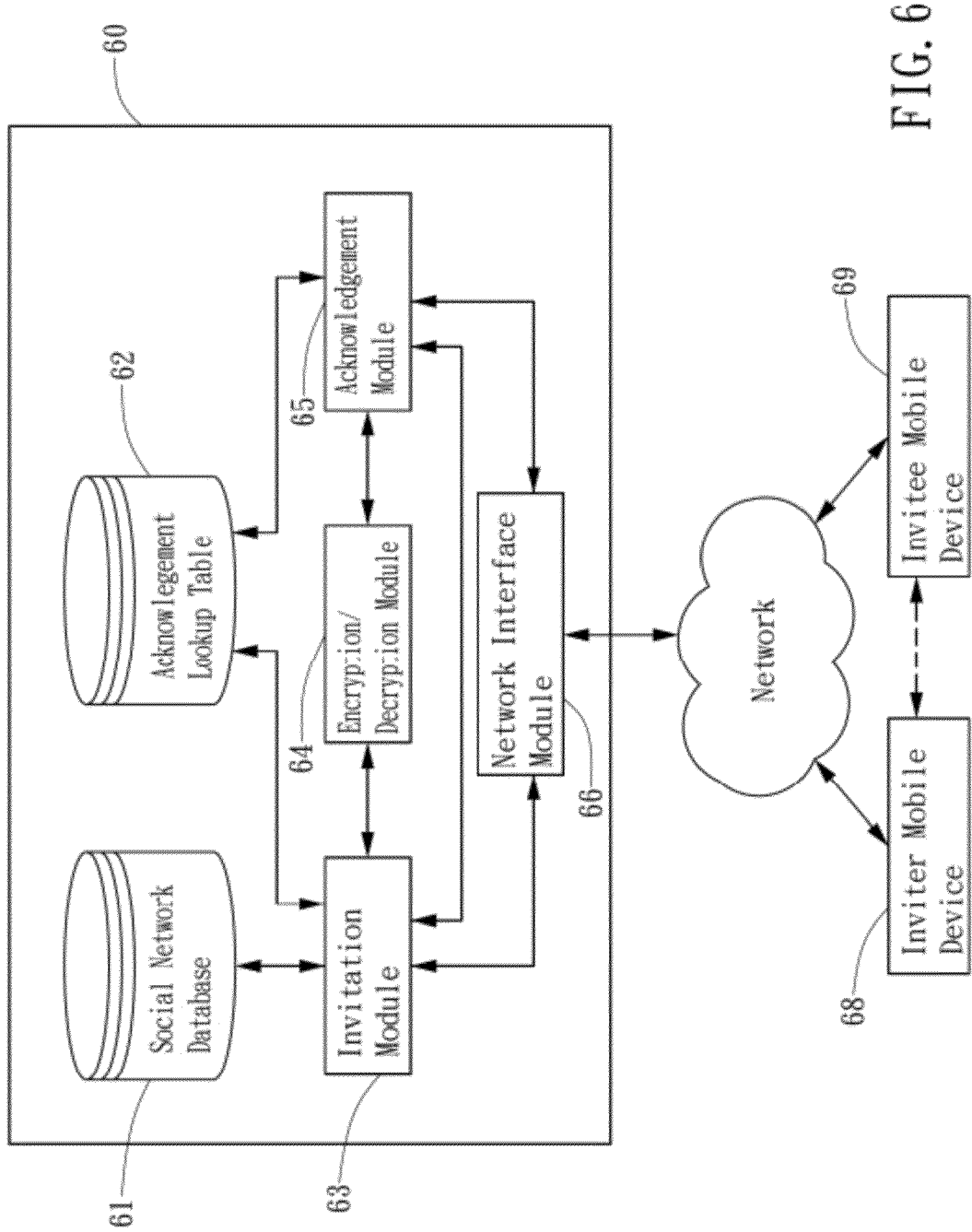
FIG. 6 is a schematic view showing the SNS is connecting to the mobile device via a network.

FIG. 6 is a schematic view showing the SNS is connecting to the mobile device via a network. FIG. 6 illustrates an exemplary architecture that may be used to send an invitation to an invitee mobile device according to inviter mobile device's request and to do society association according to the acknowledgement from the invitee mobile device.

As shown in FIG. 6, the mobile devices 68 and 69 exchange each other's IP address, token and MD Public Key prior to initiate a society association process with the SNS 60 containing an Invitation Module 63, an Acknowledgement Module 65, and an EDM. The Invitation Module 63 interfaces with the Social Network Database 61 for conducting society association while stores temporary invitation information in the Acknowledgement Lookup Table 62. The Acknowledgement Module 65 manages the space of the Acknowledgement Lookup Table 62 and generates an SNS Token for each invitation. Both the Invitation Module 63 and the Acknowledgement Module 65 interface with the Network Interface Module 66 for communicating with the mobile devices 68 and 69. The Network Interface Module 66 to which the Invitation Module 63 and the Acknowledgement Module 65 are interfacing is provided by any general-purpose operating system.

Figure 7:
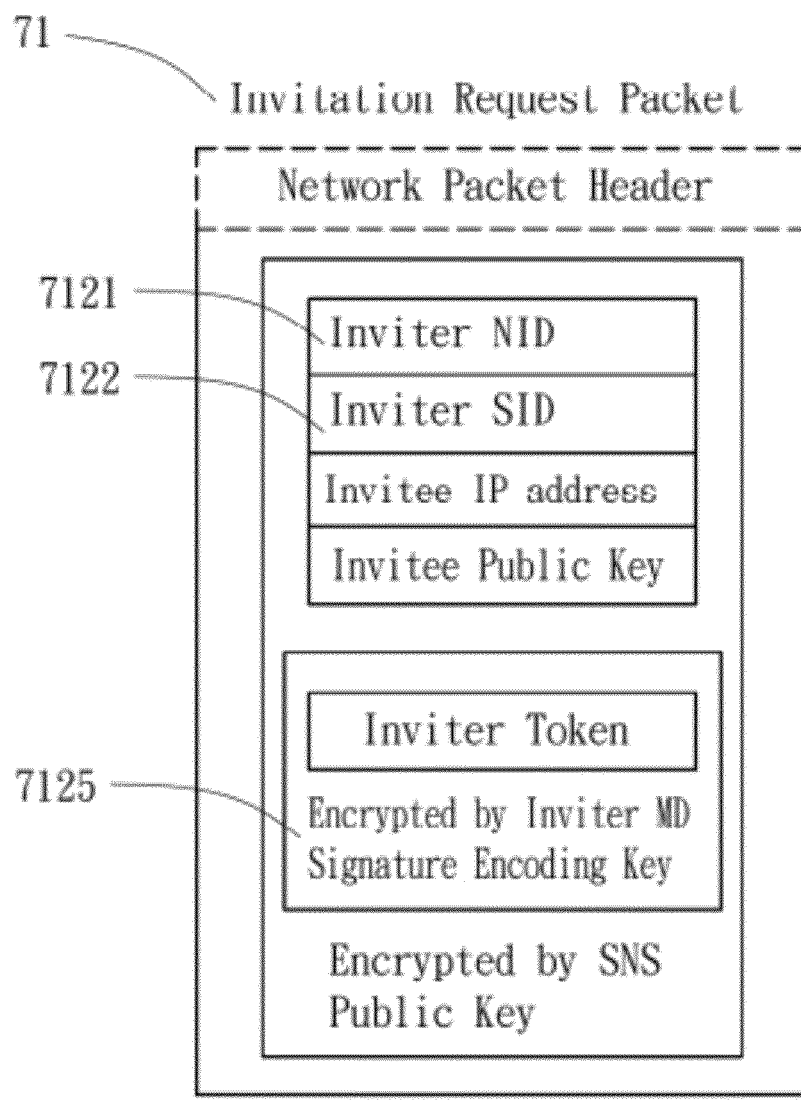
FIG. 7 is a schematic view showing an Invitation Request Packet according to the present invention.

FIG. 7 is a schematic view showing an Invitation Request Packet according to the present invention. Cross referring to FIG. 6 and FIG. 7, Invitation Module 63 receives Invitation Request Packet 71 from the Network Interface Module 66. To authenticate the received Invitation Request Packet 71, the Invitation Module 63 1) requests the EDM 64 to decrypt the payload of received Invitation Request Packet 71 by the SNS Private Key; 2) uses the Inviter NID 7121 to retrieve the inviter's MD signature decryption key 1112 in the Social Network Database 61; 3) requests the EDM 64 to decrypt the encrypted Inviter Token by the retrieved MD signature decryption key 7125; 4) check whether the decryption result, i.e. the Inviter Token, is text-based; if the decryption result is text-based, 5) uses the Inviter NID 7121 to retrieve each SID of the society which the mobile device currently joined and compare the each retrieved SID with the Inviter SID 7122 in the Invitation Request Packet 71. If the Inviter Token is text-based after decrypting and there is a retrieved SID consistent with the Inviter SID 7122, the Invitation Request Packet passes the authentication.

The Invitation Module associates an SNS Token to each valid Invitation Request Packet. In this embodiment, the Invitation Module requests the Acknowledgement Module to give an available entry of the Acknowledgement Lookup Table, as shown in FIG. 8, to store the contents of the Invitation Request Packet. The index to the given entry is directly regarded as the SNS Token in this embodiment.

FIG. 8 is a schematic view showing an Acknowledgement Lookup Table according to the present invention, wherein the Acknowledgement Index 81 is directly regarded as the SNS Token and the contents of the Invitation Request Packet are stored in the table entry indexed by a given Acknowledgement Index. In order to generate a valid SNS Token, i.e. an index to an available entry in the embodiment, and manage the Acknowledgement Lookup Table, the Acknowledgement Module may use ring-like buffer management method including certain flag as the "In Use" flag 82 shown in FIG. 8. In this embodiment, since the SNS Token and the Acknowledgment Lookup Table are directly associated, the authentication to the received Acknowledgement can just be conducted by comparing the Society ID in the entry indexed by the SNS Token with the received Inviter SID in the Acknowledgement Packet.

FIG. 9 is a schematic view showing an Invitation Packet according to the present invention. The Invitation Module constructs the Invitation Packet 91 by including fields of the SNS Token 931, Inviter Token 932, Inviter SID and the profile of the society 933 with the Inviter SID as shown in FIG. 9. The Invitation Module requests the EDM to encrypt the payload of Invitation Packet prior to send it to the mobile device in the provided Invitee IP Address.

As mentioned, the Acknowledgement Module manages the space of the Acknowledgement Lookup Table. As the Invitation Module wants to send a new Invitation Packet, the Acknowledgement Module finds out an available entry in the Acknowledgement Lookup Table and assigns the corresponding entry index to the Invitation Module as the SNS Token.

When an invitee mobile device returns an Acknowledgement Packet, as shown in FIG. 10 which is a schematic view showing an Acknowledgement Packet according to the present invention, the Acknowledgement Module first requests the EDM to decrypt the payload of the Acknowledgement Packet 101 by the SNS Public Key 103 and then uses the Invitee NID 1032 to retrieve the invitee mobile device's MD Signature Decryption Key 1112. Then the Acknowledgement Module authenticates the Acknowledgement Packet 101 by requesting the EDM to decrypt the encrypted Invitee Token 10331 based on the retrieve MD Signature Decryption Key. If the text-based result is got after the decryption, the Acknowledgement Packet 101 is assured of being sent from the invitee mobile device and the validity of received SNS Token will be further checked. The SNS Token checking can be conducted by first retrieving the entry of Acknowledgement Lookup Table indexed by the SNS Token and then comparing the received Inviter SID with the Society ID 87 in the retrieved entry. If consistent, the Acknowledgement Packet 101 is valid and the Acknowledgement Module informs the Invitation Module to associate an invitee node identified by the Invitee NID 1032 with corresponding inviter node identified by the Inviter NID in a specified society identified by the Inviter SID.

Figure 11:
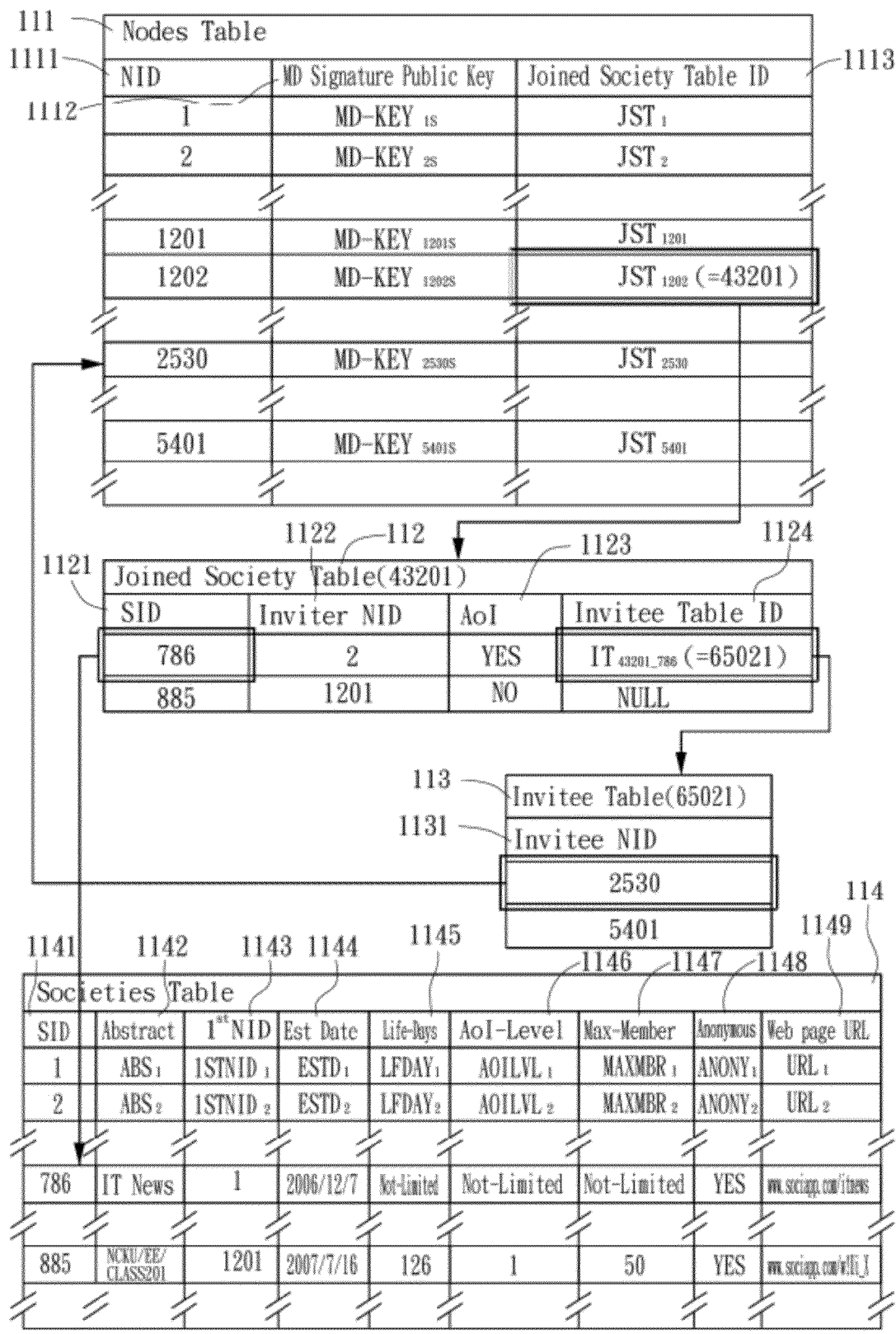
FIG. 11 is a schematic view showing a Society Network Database according to the present invention.

FIG. 11 is a schematic view showing a Society Network Database with exemplary societies according to the present invention, wherein the Social Network Database may be sufficiently managed by four kinds of tables as illustrated in FIG. 11. The four kinds of tables are associated with each other to record the managed social network in form of database. As shown in FIG. 11, the Nodes Table 111 contains fields including NID 1111, MD Signature Public Key 1112 and Joined Society Table ID (JST ID) 113. As a mobile device advertises its MD Signature Public Key to the SNS before initiating a society association process, the SNS stores the key into the Node Table 111 according to the mobile device's NID. For each NID, there is a unique Joined Society Table 112 recording the societies which a corresponding mobile device currently joined. Each Joined Society Table 112 is pointed by the field Joined Society Table ID 1113 in Nodes Table 111. The Joint Society Table 112 contains fields of SID 1121, Inviter NID 1122, Authority of Invention (AoI) 1123, and Invitee Table ID 1124. For each Joined Society Table 112, there is a unique Invitee Table 113 recording the invitee(s) which a corresponding mobile device currently and successfully invited. Each Invitee Table 113 is pointed by the field Invitee Table ID 1124 in Joined Society Table 112. The Invitee Table 113 contains fields of Invitee NID 1131. The Society Table 114 contains fields of SID 1141, Abstract 1142, First NID 1143, Established Date (Est. Date 1144), Life-Days 1145, AoI Level 1146, Maximum Number of Members (Max. Members 1147), Anonymous 1148, and Web page URL 1149.

FIG. 12 is a schematic view showing two exemplary societies recorded in the social network database. Since the Joined Society Table 112 in FIG. 11 contains a field of Inviter NID 1122 and a field pointing to an Invitee Table 113 recording the invitees has been invited by the mobile device, a social network represented by tree diagram can be derived. For example, the exemplary societies recorded in the social network database in FIG. 11 can be represented by the tree diagrams as shown in FIG. 12. The Society with SID 786 and society with SID 885 are represented in tree diagram for easily figuring out the relationship between their members (, or called nodes). As shown in FIG. 12, the society with SID 786 has a mobile device with NID 1 as its root node and the root node has invited a node with NID 2 into the society with SID 786. The node with NID 1202 has been invited by the node with NID 2 and has invited node with NID 2530 and node with NID 5401 into the society with SID 786. The society with SID 885 has a mobile device with NID 1201 as its root node and the root node has invited a node with NID 1202 into the society with SID 885.

As mentioned, when receiving an Invitation Request Packet, the Invitation Module requests the EDM to decrypt the payload of the packet by the SNS Private Key. And then, in order to decrypt the encrypted Inviter Token, the Invitation Module retrieves the inviter's MD Signature Public Key from the Nodes Table according to the Inviter NID provided in the Invitation Request Packet and request EDM to decrypt the encrypted Inviter Token. If after decrypted the Inviter Token is valid, i.e. text-based token in the embodiment, then the Invitation Module retrieves each SID of the society which the mobile device joined by first retrieving the JST ID in the entry indexed by the Inviter NID and using the retrieved JST ID to retrieve a Joined Society Table. The Invitation Module compares the Inviter SID with the SIDs recorded in the retrieved Joined Society Table. If there is a SID in the Joined Society Table consistent with the Inviter SID, the inviter mobile device is assured of having joined the society with the Inviter SID.

refer to FIG. 8 for an example, wherein an inviter mobile device having 1202 as its NID and "Ken" as its Inviter Token sends an Invitation Request Packet the SNS to invite an invitee mobile device in IP address 140.93.35.73 to join the society with SID 885. After the decryption process mentioned above, the Invitation Module checks whether the inviter mobile device is of the society with SID 885. This can be conducted by first find the entry with NID 1202 in Nodes Table shown in FIG. 11 and then get the JST ID in that entry. As shown in FIG. 11, the inviter mobile device has it JST ID as 43201 and by using the JST ID, a Joined Society Table with JST ID 43201 can be retrieved. As recorded in Joined Society Table with JST ID 43201, the inviter mobile device has joined the society with SID 786 and the society with SID 885. Since the Inviter SID is consistent with an SID, i.e. 885, in the Joined Society Table, the inviter mobile device is assured of having joined the society with the Inviter SID.

As shown in FIG. 11, the Joined Society Table 112 further comprises a flag called Authority of Invitation (AoI) 1123. The flag is derived from the field AoI-Level in Societies Table 114, wherein the AoI-Level 1146 specifies from the root node, nodes within how many level have authority to conduct invitation for that society. The AoI flag 1123 is cached in the Joined Society Table 112 for quickly determine whether the node has authority to invite other mobile device.

Turn to the example of the mobile device with NID 1202, since the AoI flag 1123 in the mobile device's Joined Society Table 112 records the symbol "YES", the mobile device has authority to invite new member for the society with SID 786. Hence after receiving the Invitation Request Packet from the mobile device, the Invitation Module will request the Acknowledgement Module for a valid SNS Token. As shown in FIG. 8, the Acknowledgement Module gives an Acknowledgement Index of 53026 as a valid SNS Token and the Invitation Module stores the contents of the Invitation Request Packet into the entry indexed by SNS Token 53026 in the Acknowledgement Lookup Table. An Invitation Packet including the SNS Token 53026, the Inviter Token "Ken", the Inviter SID 786 and the profile of the society with SID 786 is then sent to the invitee mobile device in IP address 140.93.35.73, wherein the profile of the society with SID 786 contains Abstract "IT News", Life-Days "Unlimited", AoI "Yes", Max-Members "Unlimited", Anonymous "Yes" and the website URL www.sociapp.com/itnews.

Figure 13:
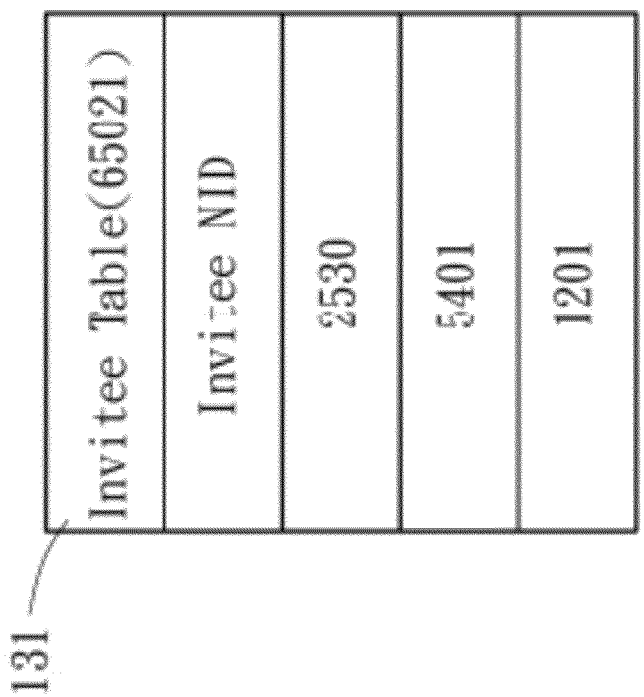
FIG. 13 is a schematic view showing an Invitee Table according to the present invention.

If the invitee mobile device in IP address 140.93.35.73 accepts the invitation, an Acknowledgement Packet containing the SNS Token 53026, Inviter SID 786 and Invitee NID, i.e. 1201 in this example, is sent from the invitee mobile device to the SNS. After decrypting the payload of the Acknowledgement Packet, The Acknowledgement Module retrieves the entry of Acknowledgement Lookup Table by the SNS Token 53026 and compares the received Inviter SID 786 with the Society ID in the retrieved entry. Since the received Inviter SID is consistent with the Society ID in the retrieved entry as 786, the Acknowledgement Packet is valid and the invitee's node with NID 1201 is associated with the inviter's society with SID 786 by linking the inviter node with NID 1202 with the invitee node with NID 1201. That is, the Invitation Module adds the NID 1201 into the Invitee Table 65021 (131 in FIG. 13) which is associated with inviter's Joined Society Table with JST ID 43201. The Invitee Table of inviter node with NID 1201 after adding NID 1201 is shown in FIG. 13, which is a schematic view showing an Invitee Table according to the present invention.

Figure 14:
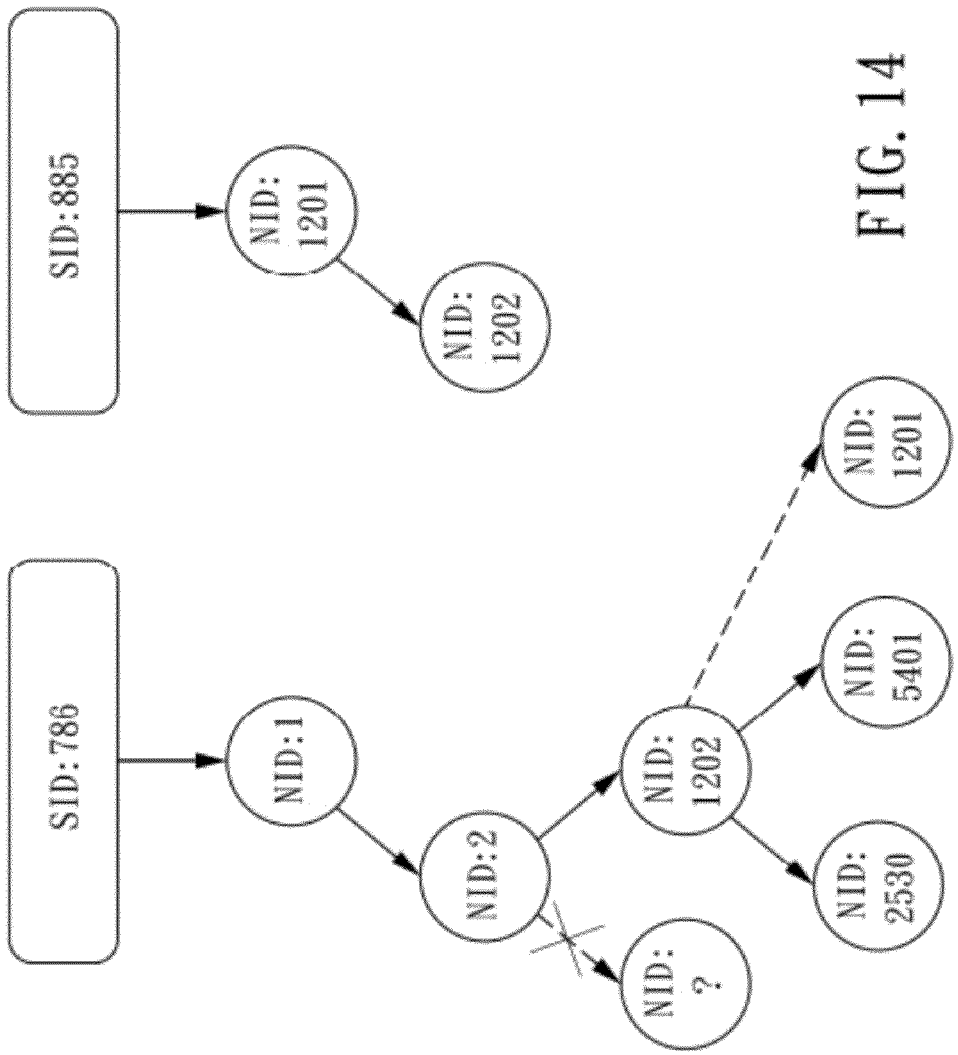
FIG. 14 is a schematic view showing the tree representation of the result of the two invitations illustrated according to the present invention.

Since the invitation initiated by the node with NID 1202 is successful and the NID 1201 is added into the Invitee Table 65021, the tree diagram of the exemplary society can be updated as shown in FIG. 14. As another example in FIG. 8 and FIG. 14, where the node with NID 2 initiated an invitation to invite a mobile device in IP address 140.96.194.35 but rejected by the invitee. Since the invitee rejected to join the society with SID 786, the invitee did not return its NID, hence even the SNS cannot know of what NID the invitee is. Such a result further assures the user privacy of the system according to the invention.

FIG. 14 is a schematic view showing the tree representation of the result of the two invitations illustrated according to the present invention.

To further understand and recognize the fulfilled functions and structural characteristics of the present invention, below illustrates another application employing the present invention.

Figure 15:
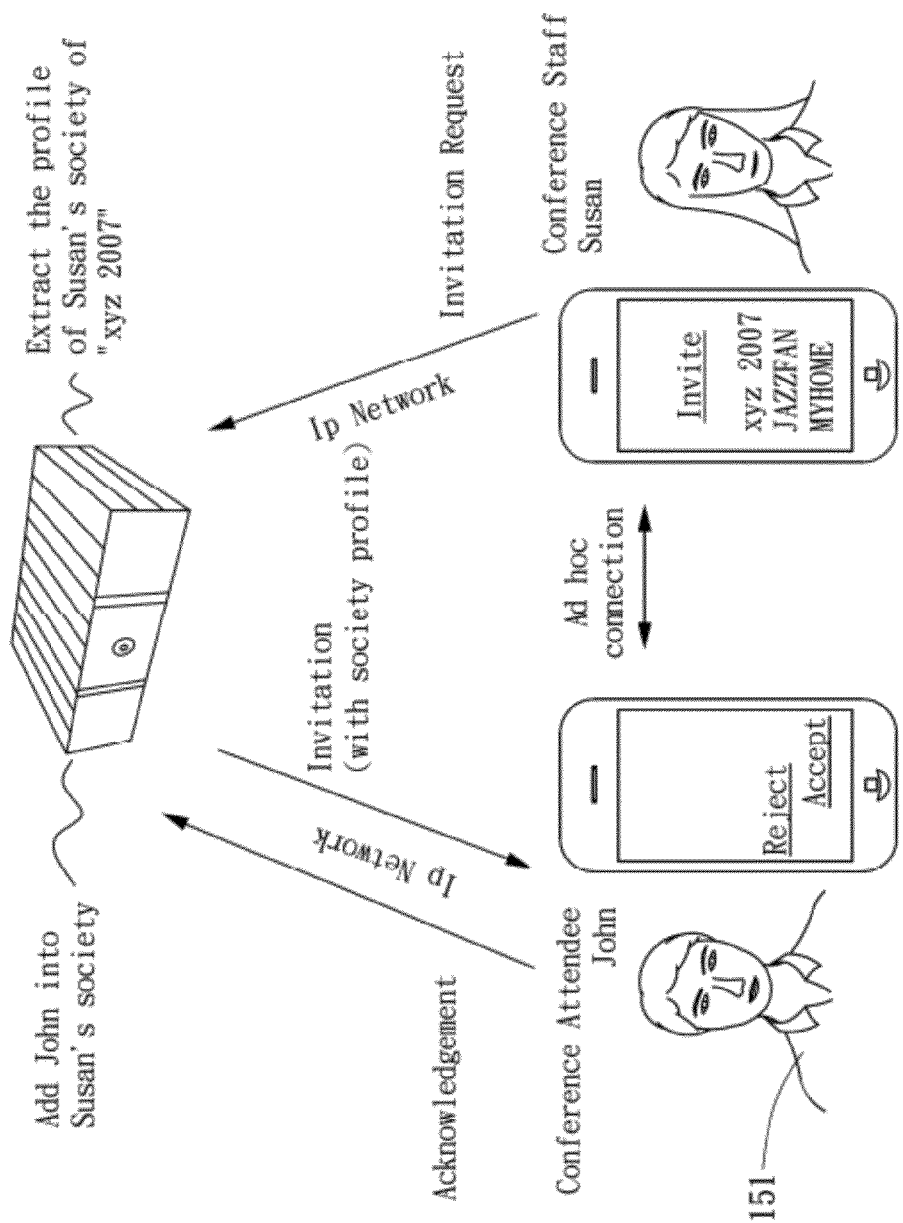
FIG. 15 is a schematic view showing how a conference attendee attending a conference according to the present invention.

Please refer to FIG. 15, FIG. 15 is a schematic view showing how a conference attendee attends a conference and applies the present invention to easily join the society established for the conference.

As seen in FIG. 15, a conference attendee John 151 now is attending a conference. When he first time arrives the conference, he may go to the conference reception counter and meet with the conference staff for registration. During the registration, a conference staff Susan used her mobile device to make an ad hoc connection with John's mobile device as this invention revealed. During the ad hoc connection, John's mobile device and Susan's mobile device exchange their network address and their text-based token. Each mobile device displayed the token it got on the screen of the mobile device, so that John and Susan can make assure with whom they are ad hoc connected with. After the exchanging, each user of the mobile device could be the inviter mobile device to initiate an invitation as depicted in present invention. In this example, Susan, as a conference staff, initiated an invitation by using her mobile device to send the Invitation Request to the SNS, wherein the Invitation Request contains the network address of John's mobile device, the NID of Susan's mobile device, the SID of the conference society and the text-based token of Susan's mobile device. After the Invitation Request was receipted by the SNS, SNS checked the validity of the Invitation Request as depicted in this invention. In this example, the Invitation Request was valid and then the SNS retrieved the profile of the conference society specified by the SID in the Invitation Request, generated an SNS token and sent an Invitation to John's mobile device as specified by the invitee network address in the Invitation Request, wherein the Invitation contains the SID of the conference society, the retrieved profile, the generated SNS token, the text-based token of Susan's mobile device. After the Invitation was receipted by John's mobile device, John's mobile device checked the validity of this Invitation by checking whether the text-based token in the Invitation is consistent with the previous got token, i.e. the one got via the previous ad hoc connection. In this example, they were consistent and the profile in the Invitation was displayed in the screen of John's mobile device. Then John's mobile device asked for whether John wants to accept the invitation. In this example, John accepted the invitation and, consequently, John's mobile device sent an Acknowledgement to the SNS, wherein the Acknowledgement contains the NID of John's mobile device, the receipted SNS Token and the received SID. After the Acknowledgement was receipted and checked by the SNS, SNS associated the corresponding node of John's mobile device with the conference society via the method/system revealed in this invention.

Note that, above example does not include some technical items related to security considerations such as encryption, decryption and the signatures of both mobile devices, since these technical items may be used according to the required security level. However, the above example is sufficient for understanding and recognizing the fulfilled functions and structural characteristics of the present invention The above specification, examples, and data provide a complete description of the manufacture and use of the composition of the invention. Since many embodiments of the invention can be made without departing from the spirit and the scope of the invention, the invention resides in the claims hereinafter appended.

What is claimed is:

1. A method for associating two mobile devices in a social network database managed by a server, said method comprising at least steps of:
    two mobile devices exchange their network address and token with each other by ad hoc connection;
    one of said two mobile devices acts as an inviter by sending an initial invitation request message to the server via a network, wherein said initial invitation request message comprising data of the inviter's token, a inviter's node identification (inviter NID), an identification of the inviter specified society (inviter SID) and the network address of the other mobile device;
    said server verifies the initial invitation request message by checking the consistency between the inviter NID and inviter SID and the data stored in the society network database;
    if consistent, said server generates and sends an invitation request message to the other mobile device acting as an invitee at the network address via said network, wherein the invitation request message comprising a server token which is generated by said server, the inviter's token and a profile of the society specified by said inviter SID;
    said invitee checks the consistency between the inviter's token in the invitation request message and the token being exchanged during the ad hoc connection;
    if consistent, said profile of the society is displayed on the invitee's screen and waiting for a invitee's user whether to accept the invitation request message;
    if said user accepts the invitation request message, said invitee sends an acknowledgement message to said server via said network,
    wherein said acknowledgement message comprising the server token and a invitee's node identification (invitee NID);
    said server checks whether the server token in the acknowledgement message is valid; and
    if valid, the server associates the invitee's node with the inviter's node in the society specified by said inviter SID.

2. The method of claim 1, wherein the two mobile devices can be combinations of wireless communication equipments selected from the group consisting of cell phone, smart phone, notebook computer, wireless personal digital assistant (PDA) and walkie-talkie.

3. The method of claim 1, wherein the network address is an IP-based network address.

4. The method of claim 1, wherein the ad hoc connection can be one of an IrDA connection, RFID connection or Bluetooth connection.

5. The method of claim 1, wherein the network can be one of an IP-based network address and telecommunication subscriber identity module (SIM).

6. The method of claim 1, wherein the token is a text-based token with text encoded by formatted characters of ASCII characters.

7. The method of claim 1, wherein said server and the two mobile devices have their own key pair including a public key and a secret key of the Public-key Cryptography, wherein said server's public key is advertised to all the mobile devices while the mobile device's public key is advertised to said server and is exchanged between said two mobile devices.

8. The method of claim 1, wherein the messages sent to the server are encrypted by the server's public key.

9. The method of claim 1, wherein the initial invitation request message sent to the server further comprises a public key of the invitee and said server encrypts the invitation request message before sending it to the invitee.

10. A server for conducting society association, comprising:
    a communication interface used in a communication with at least two mobile devices via a network;
    a memory for storing a plurality of instructions; and
    a processor used in the communication with the communication interface and the memory, wherein the processor performs actions based at least partially on the plurality of instructions, comprising:
    receiving a first message from the mobile device acting as an inviter mobile device if the first message at least comprising a node identification, a token and a network address;
    allocating a memory space for temporarily storing the content of the first message;
    referring the address of the memory space as a server token;
    sending a second message to a mobile device acting as a invitee mobile device at the network address, wherein the second message comprising at least the server token and the token;
    receiving a token from the invitee mobile device;
    determining whether the token send by the invitee mobile device is consistent with the server token; and
    associating the invitee with the inviter's society.

11. The server of claim 10, wherein said two mobile devices can be combinations of wireless communication equipments selected from the group of cell phone, smart phone, notebook computer, wireless personal digital assistant (PDA) and walkie-talkie.

12. The server of claim 10, wherein the network can be the combination of an IP network and a telecommunication network.

13. The server of claim 10, wherein the memory can be combinations of hard disk, CD-ROM, RAM and NVRAM.

14. The server of claim 10, wherein the communication interface can be a network interface controller which enables the server to link to said network.

15. The server of claim 10, wherein the network address can be one of a IP-based network address or a telecommunication subscriber identity module (SIM).

16. The server of claim 10, wherein the token from the inviter mobile device is a text-based token with text encoded by formatted characters of ASCII characters.

17. A mobile device for conducting society association, comprising:
    a communication interface used in a communication via a network with a server managing social network database, wherein the communication interface is assigned with a network address;
    a data exchanging interface for exchanging data with other mobile device in surrounding;
    a memory for storing a plurality of instructions and a local token;

a processor used in communication with the communication interface, the data exchanging interface and the memory, wherein the processor performs actions based at least partially on the plurality of instructions, comprising:

enabling the data exchanging interface to exchange the local token and the network address with a mobile device in surrounding;

storing the exchanged token as a remote token in the memory;

as an inviter, sending a first message to said server to start a society association process, wherein the first message comprising a mobile device's node identification (NID) as the inviter node identification (inviter NID), the local token and a remote network address;

as an invitee, receiving a second message comprising an inviter's local token and a server token from the server;

as an invitee, checking whether the second message is valid by comparing the inviter's local token with the remote token;

as an invitee, sending a third message including the server token to the server to complete a society association process.

18. The mobile device of claim 17, wherein the communication interface can be a network interface controller which enables the server to link to said network.

19. The mobile device of claim 17, wherein the network can be an IP network or a telecommunication network.

20. The mobile device of claim 17, wherein the network address can be one of an IP-based network address or a telecommunication subscriber identity module (SIM).

21. The mobile device of claim 17, wherein the mobile device can be selected from the group consisting of cell phone, smart phone, notebook computer, wireless personal digital assistant (PDA) and walkie-talkie.

22. The mobile device of claim 17, wherein the token is a text-based token with text encoded by formatted characters of ASCII characters.

* * * * *